(12) United States Patent
Heard

(10) Patent No.: US 12,533,847 B2
(45) Date of Patent: Jan. 27, 2026

(54) SYSTEMS, METHODS, AND ASSEMBLIES FOR A THREE-DIMENSIONAL PRINTER

(71) Applicant: Jason Heard, Lake Elsinore, CA (US)

(72) Inventor: Jason Heard, Lake Elsinore, CA (US)

( * ) Notice: Subject to any disclaimer, the term of this patent is extended or adjusted under 35 U.S.C. 154(b) by 84 days.

(21) Appl. No.: 18/772,009

(22) Filed: Jul. 12, 2024

(65) Prior Publication Data
US 2025/0018647 A1  Jan. 16, 2025

Related U.S. Application Data

(60) Provisional application No. 63/526,422, filed on Jul. 12, 2023.

(51) Int. Cl.
*B29C 64/25* (2017.01)
*B33Y 30/00* (2015.01)

(52) U.S. Cl.
CPC ............. *B29C 64/25* (2017.08); *B33Y 30/00* (2014.12)

(58) Field of Classification Search
CPC ..... B29C 64/232; B29C 64/25; B29C 64/255; B29C 64/259
See application file for complete search history.

(56) References Cited

U.S. PATENT DOCUMENTS

| | | | |
|---|---|---|---|
| 9,709,207 B1* | 7/2017 | Huang | B29C 64/25 |
| 2015/0352789 A1* | 12/2015 | Haider | B33Y 30/00 |
| | | | 264/129 |
| 2016/0039149 A1* | 2/2016 | Cassara | B29C 64/118 |
| | | | 425/150 |
| 2016/0144564 A1* | 5/2016 | Padgett | B29C 64/209 |
| | | | 425/113 |
| 2016/0193709 A1* | 7/2016 | Johnson | B23Q 1/015 |
| | | | 425/375 |
| 2017/0151704 A1* | 6/2017 | Go | B29C 48/266 |

* cited by examiner

Primary Examiner — Matthew J Daniels
(74) Attorney, Agent, or Firm — Umberg Zipser LLP; Ryan Dean

(57) ABSTRACT

Assembly for three-dimensional or additive printers are disclosed comprising a base and various sidewalls. Critically, the pieces forming the assembly and the internal structure are each formed from a single, flat piece of material that is cut with water or a laser to create the desired shape and form a set of apertures at precise locations. Various components of the printer can be attached using the apertures to ensure they are positioned at precise locations within the assembly. This includes, for example, a main gantry assembly and a carriage assembly, as well as the components that permit their movement and support them within the assembly.

6 Claims, 18 Drawing Sheets

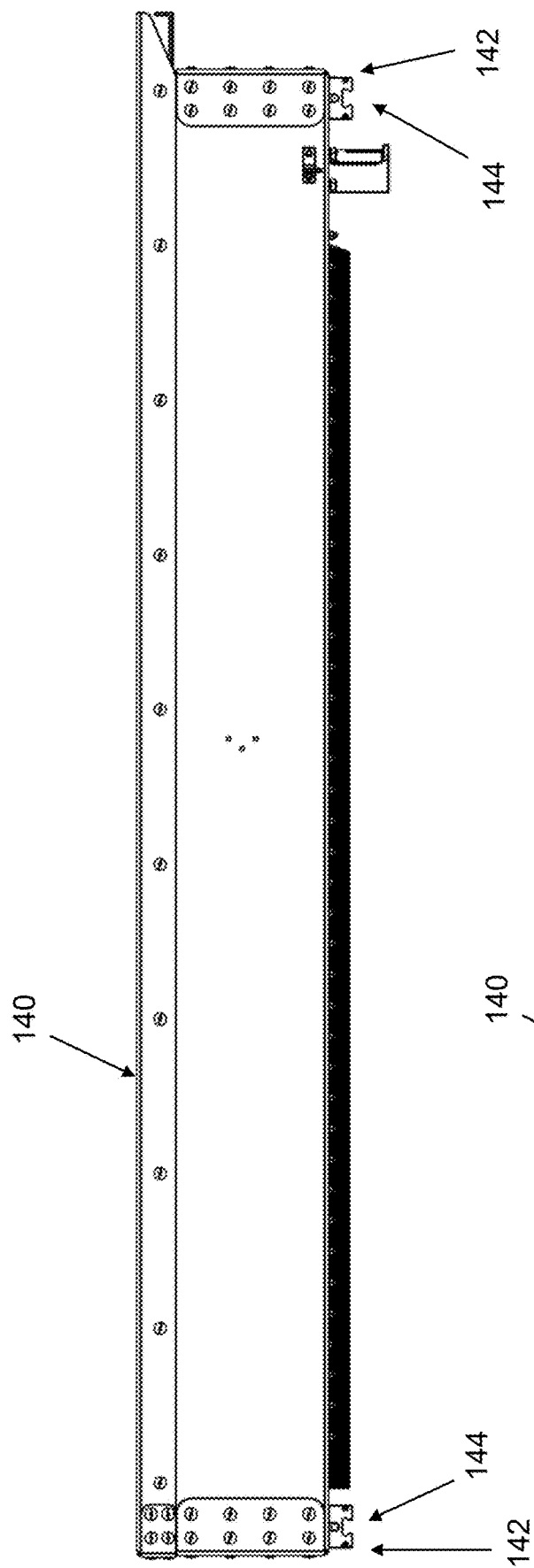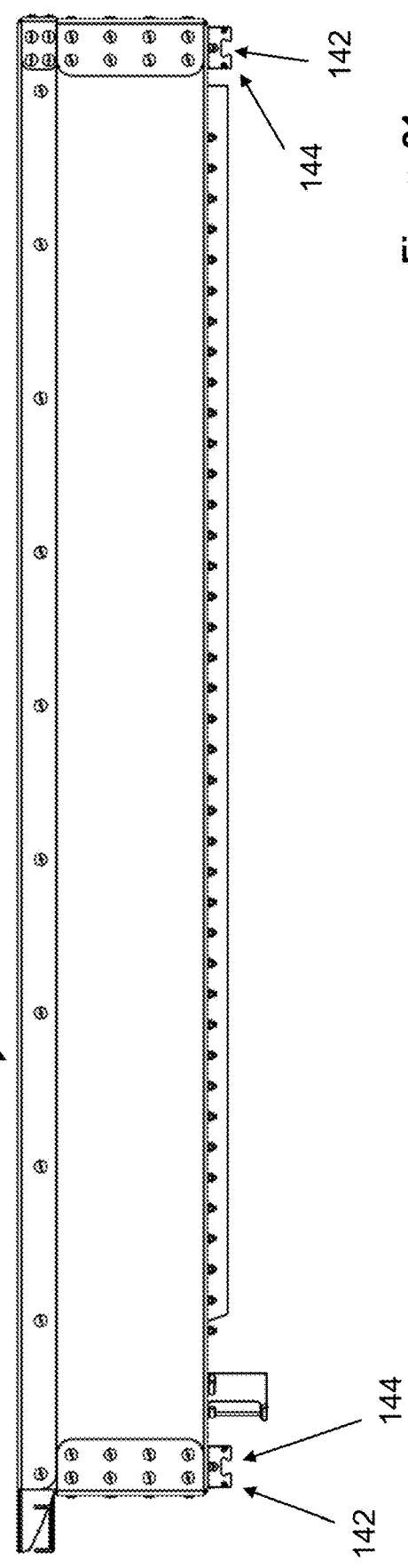

SYSTEMS, METHODS, AND ASSEMBLIES FOR A THREE-DIMENSIONAL PRINTER

This application claims priority to U.S. provisional patent application having Ser. No. 63/526,422 filed on Jul. 12, 2023. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is three-dimensional or additive printers.

BACKGROUND

The following description includes information that may be useful in understanding the present invention. It is not an admission that any of the information provided herein is prior art or relevant to the presently claimed invention, or that any publication specifically or implicitly referenced is prior art.

In general, three-dimensional printing or additive manufacturing utilizes an extruder or other print head that can be moved in three dimensions (i.e., along the x-axis, y-axis, and z-axis) and that heats and deposits a filament on to a print bed. These three-dimensional printers typically have two styles: an open case or an enclosed case.

The open case printers generally have a print bed with a vertical frame that can move along a y-axis of the print bed. The print bed is the location where the extruded material is placed on to by the print head and may be heated.

The vertical frame supports the print head and other components via a carriage. The carriage comprises a motor that can cause the print head to move along the x-axis of the print bed. In addition, the vertical frame typically comprises one or more threaded rods or bolts that, when rotated, cause the carriage to move along a z-axis (i.e., perpendicular to both the x-axis and the y-axis), which thereby changes a height of the print head relative to the print bed.

The closed case printers are usually similar to the open case printers, except that they are enclosed by sheets of material on each side of the printer to thereby prevent drafts and other external factors from interfering with the print job.

Most commonly three-dimensional printers are utilized for small prints with print beds typically sized between 220×220 mm up to 500×500 mm.

While large-format three-dimensional printers exist, they are generally cost prohibitive with costs ranging from $30,000 and up. In addition, they generally utilize an extruded frame that is wrapped in sheet metal or plexiglass. This can result in a lower accuracy of printing where the various components of the frame or assembly are not properly aligned.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for large-format, three-dimensional printers with non-extruded frames having a high level of accuracy.

SUMMARY OF THE INVENTION

The inventive subject matter provides apparatus, systems, and methods for large-scale three-dimensional printers. As used herein, the term "large-scale, three-dimensional printers" means printers having a print bed dimension of at least 1,000 mm×1,000 mm, and more preferably at least 1,500 mm×1,500 mm.

Contemplated printers have an assembly that preferably comprises flat pieces of sheet metal, which are each laser or water cut to create apertures used to secure components of the printer. The precise cuts and precise locations of the apertures provide accurate positioning and alignment of the important components of the printer. As used herein, the term "laser or water cut apertures" means apertures or holes that are each cut in a material using a laser or a water jet. In addition, the use of laser-cut or water-cut flat pieces of sheet metal for the frame substantially reduces the overall cost to manufacture the large-scale three-dimensional printer and eliminates the need for a separate frame structure and case simplifying assembly of the printer.

The use of laser cutting on a single piece of sheet metal, while reducing the overall cost of the component, also advantageously allows for cut widths that are extremely small (i.e., less than 0.0001 inch or 0.00254 mm) while providing highly precise dimensional accuracy at approximately ±0.0005 inch (±0.0127 mm). This allows for the components of the assembly to be placed in precise locations relative to the flat pieces of sheet metal. As used herein, the term "precise locations" means an accuracy within ±0.001 inch (±0.0254 mm) or greater, and more preferably within ±0.0005 inch (±0.0127 mm) or greater.

The contemplated assemblies therefore can utilize a sheet metal structure as both the enclosure and frame of the printer assembly. This eliminates the need for a separate support frame (traditionally made from extrusion) and then a separate structure attached to the support frame.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

FIG. 20 is a rear view of the carriage assembly of FIG. 18.

FIG. 21 is a front view of the carriage assembly of FIG. 18.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
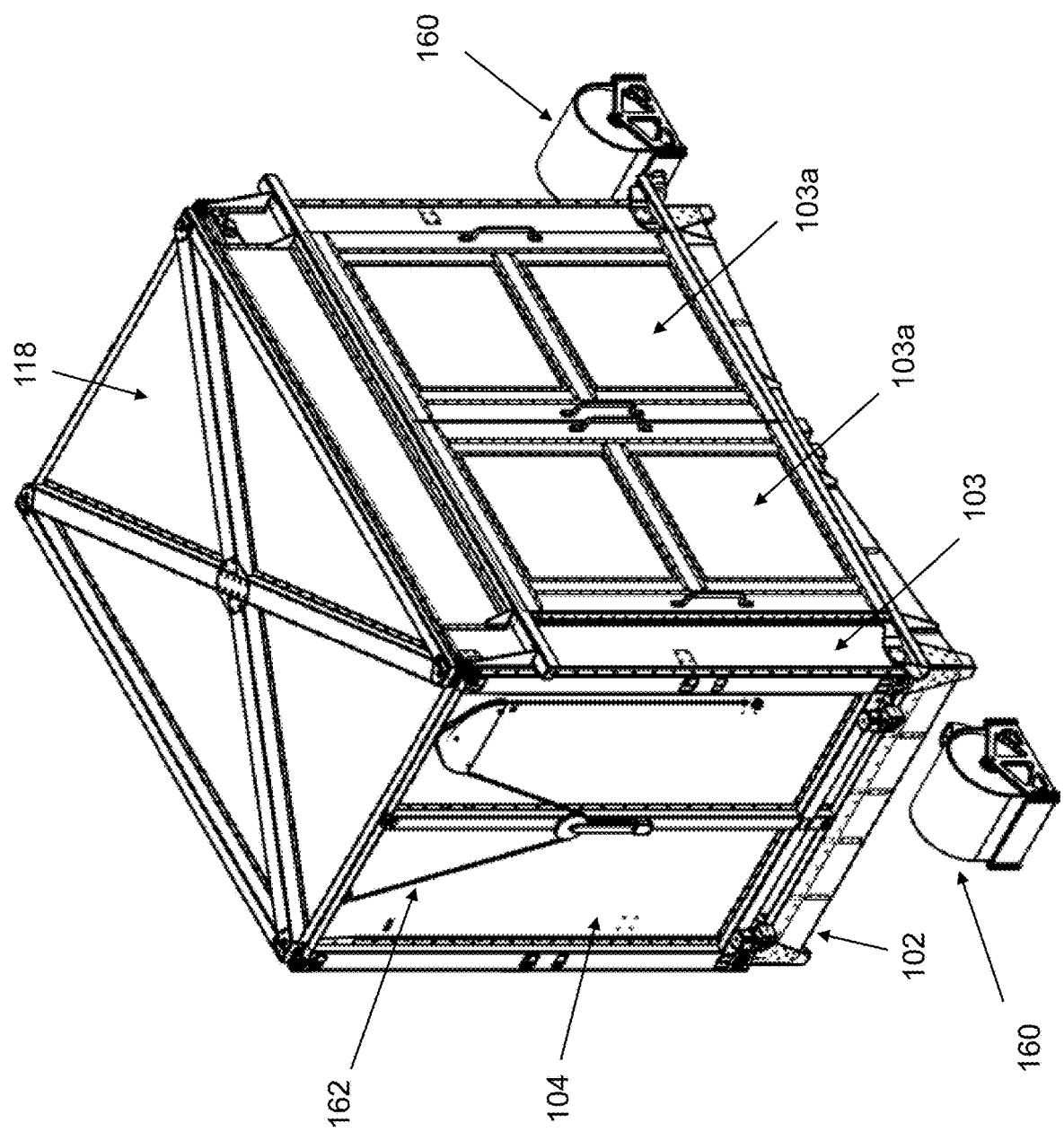
FIG. 1 is a perspective view of one embodiment of a large-scale, three-dimensional printer assembly.
Figure 2:
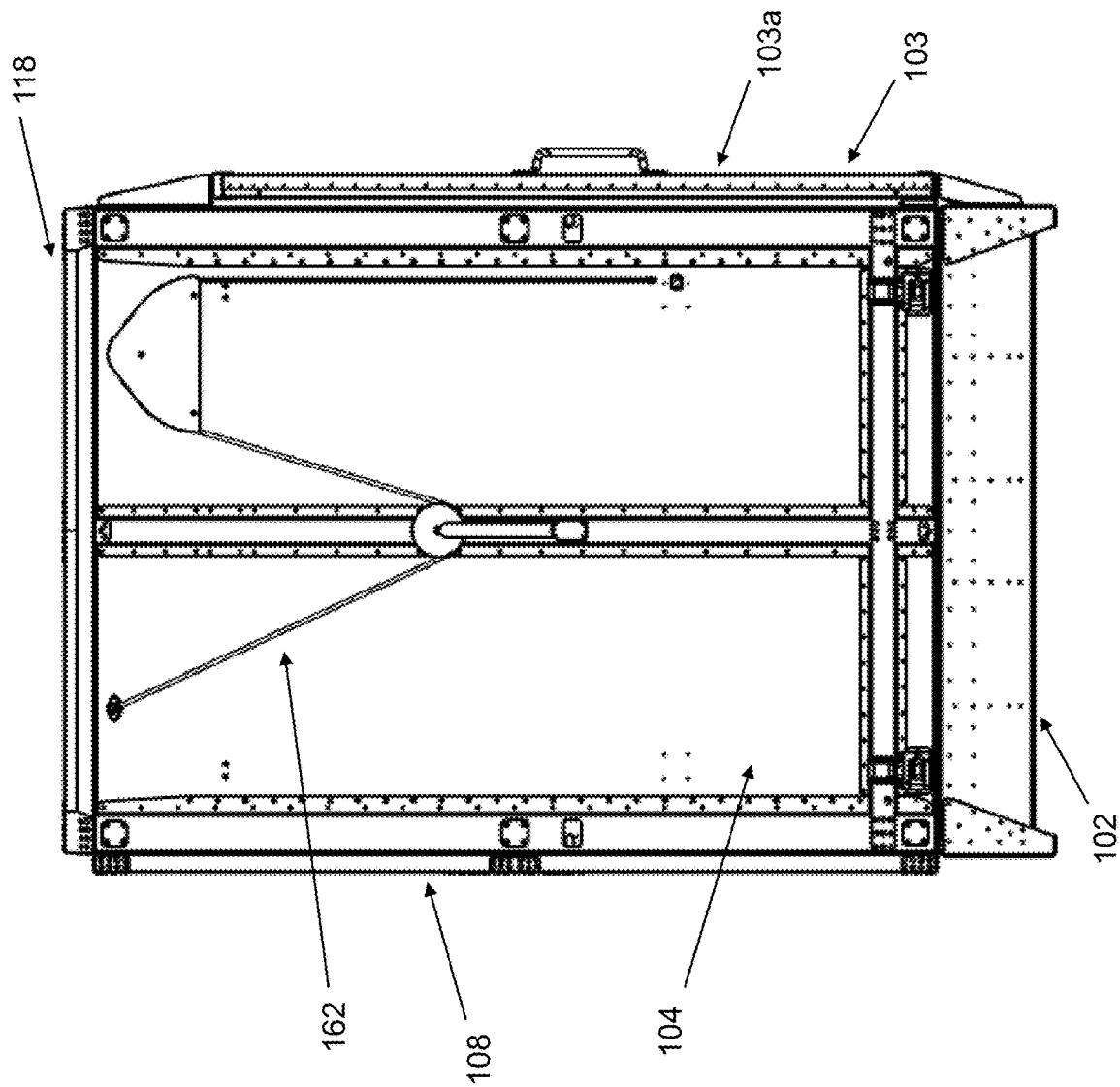
FIG. 2 is a left-side view of the assembly of FIG. 1.
Figure 3:
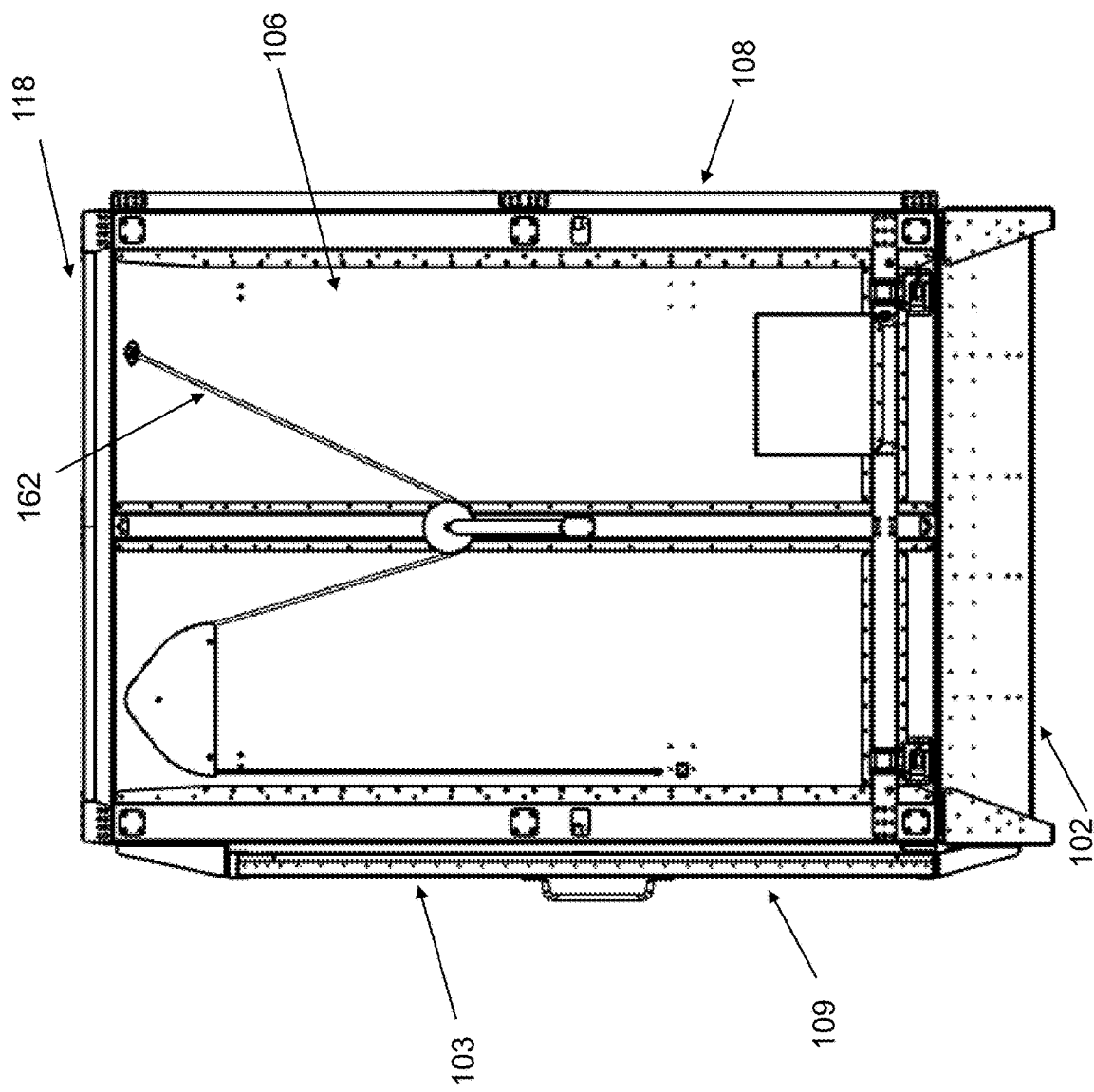
FIG. 3 is a right-side view of the assembly of FIG. 1.
Figure 4:
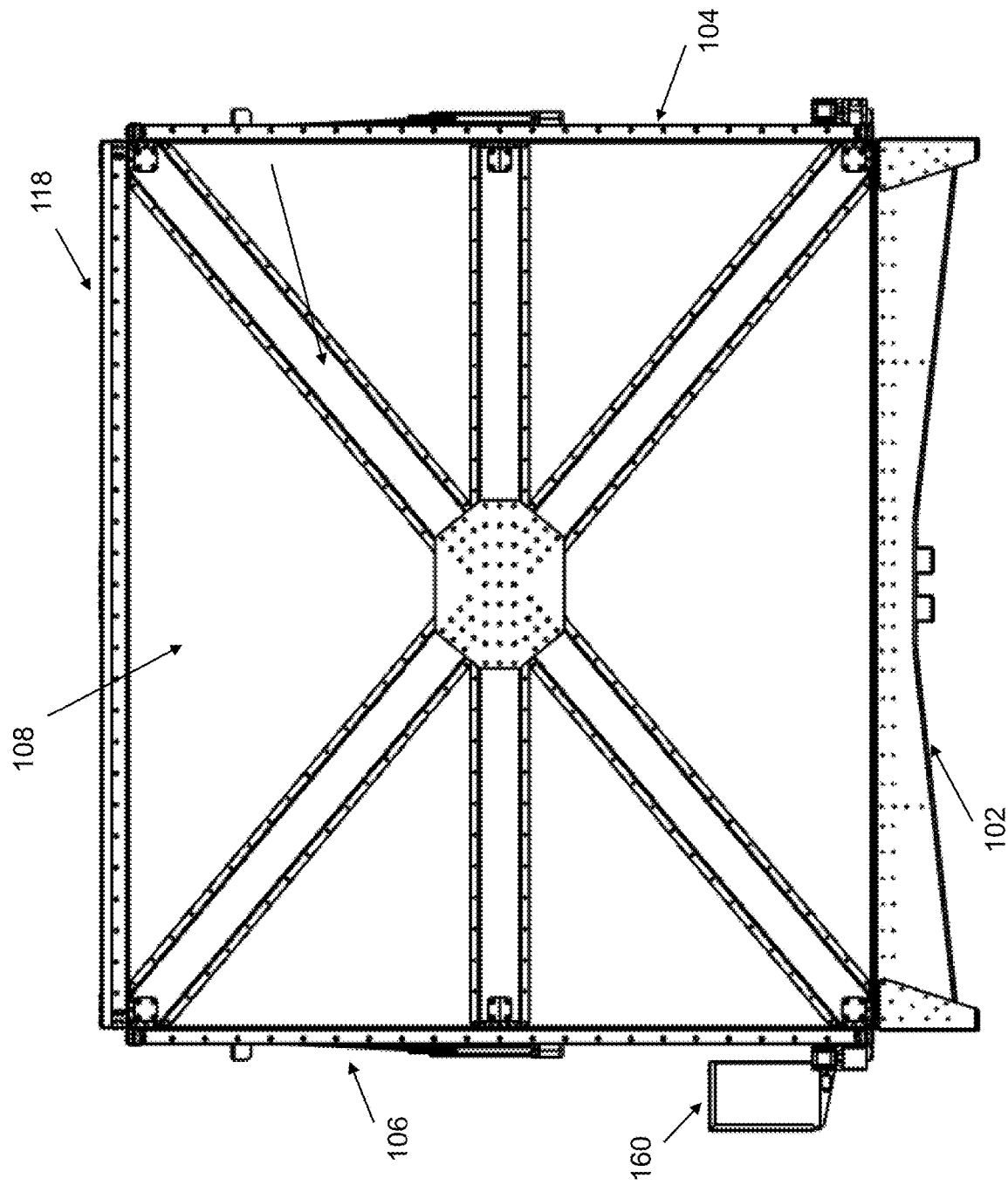
FIG. 4 is a rear view of the assembly of FIG. 1.
Figure 5:
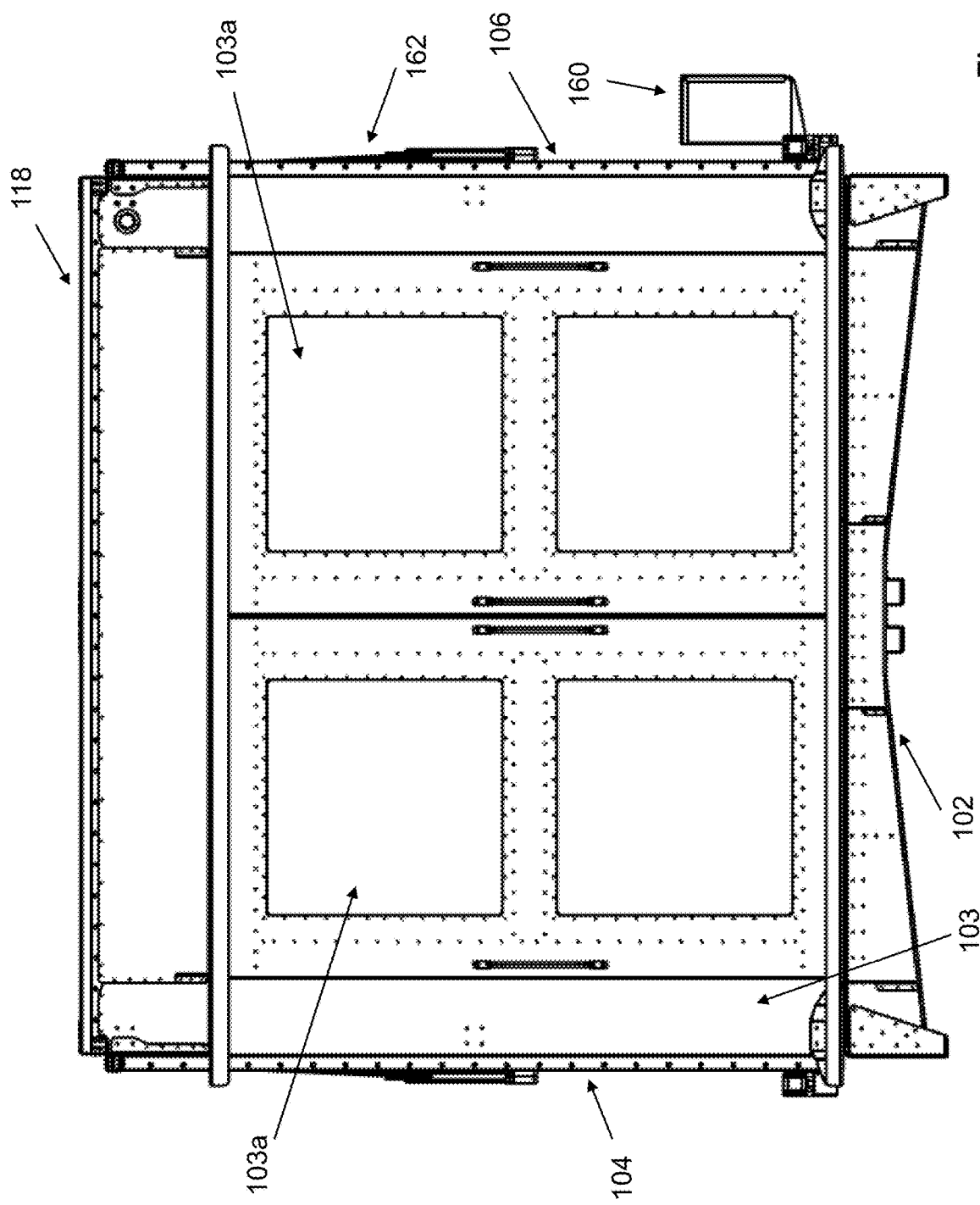
FIG. 5 is a front view of the assembly of FIG. 1.
Figure 7:
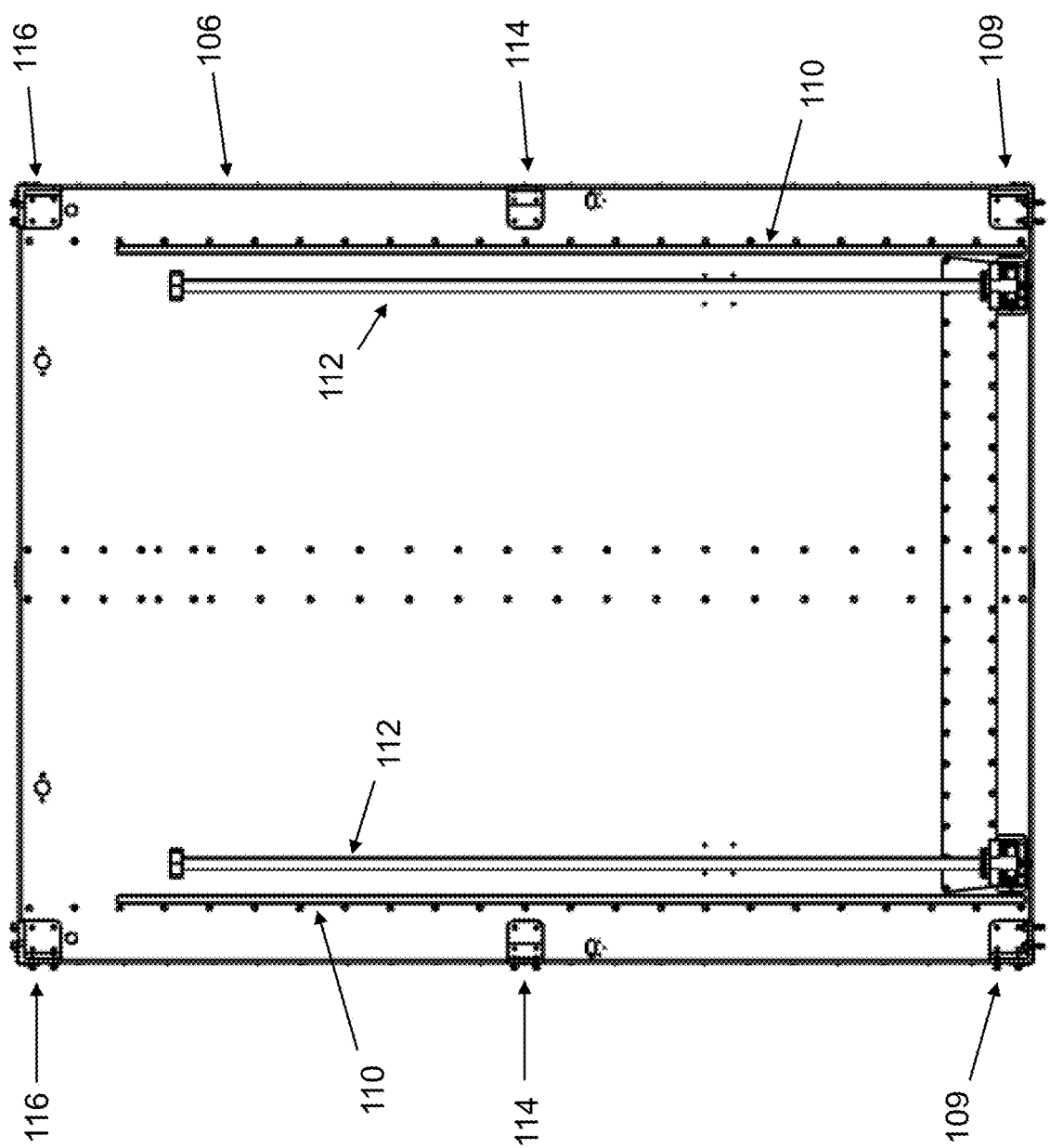
FIG. 7 is a front view of a left side wall of the printer assembly of FIG. 1, the right side wall being identical thereto.
Figure 8:
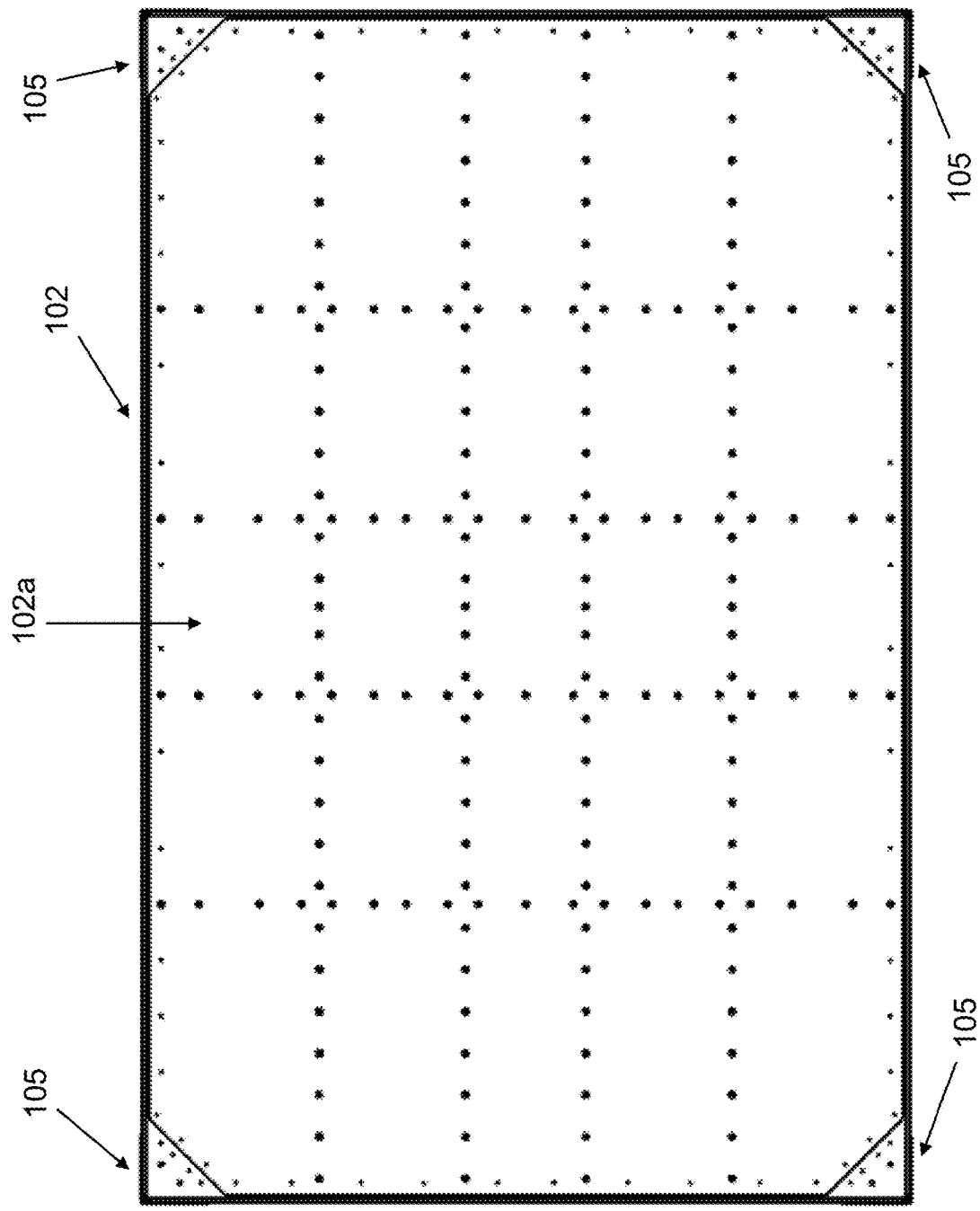
FIG. 8 is a top view of a bottom wall of the assembly of FIG. 1.
Figure 9:
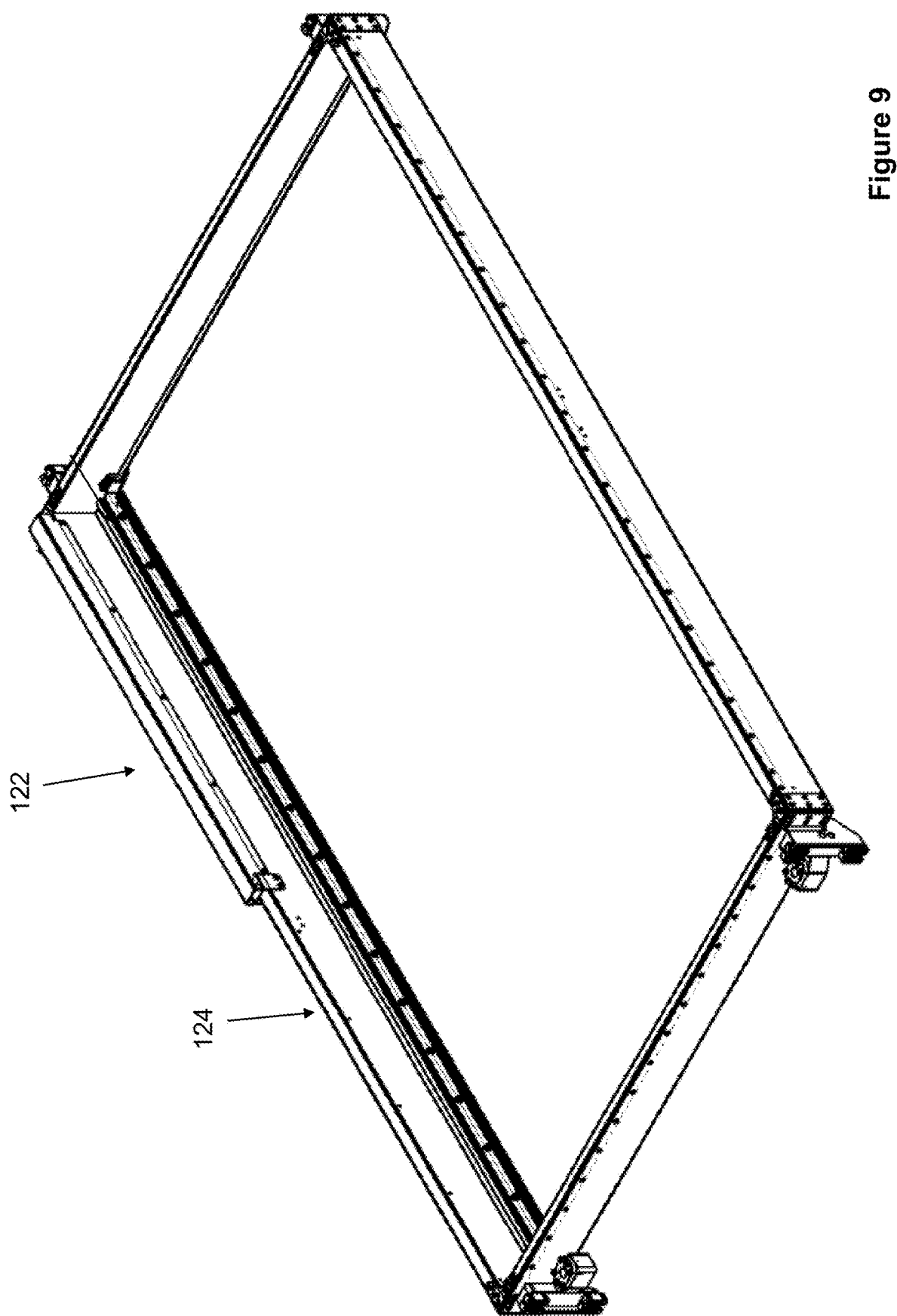
FIG. 9 is a perspective view of the main gantry assembly of the assembly of FIG. 1.
Figure 10:
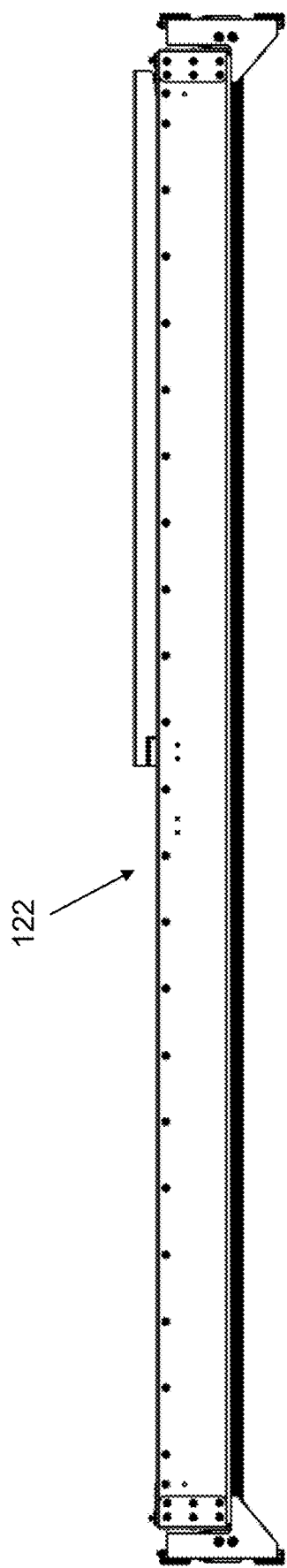
FIG. 10 is a front view of the main gantry assembly of FIG. 9.
Figure 11:
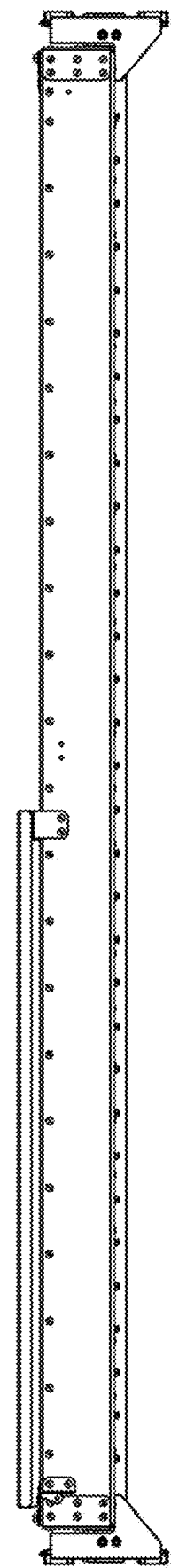
FIG. 11 is a rear view of the main gantry assembly of FIG. 9.
Figure 12:
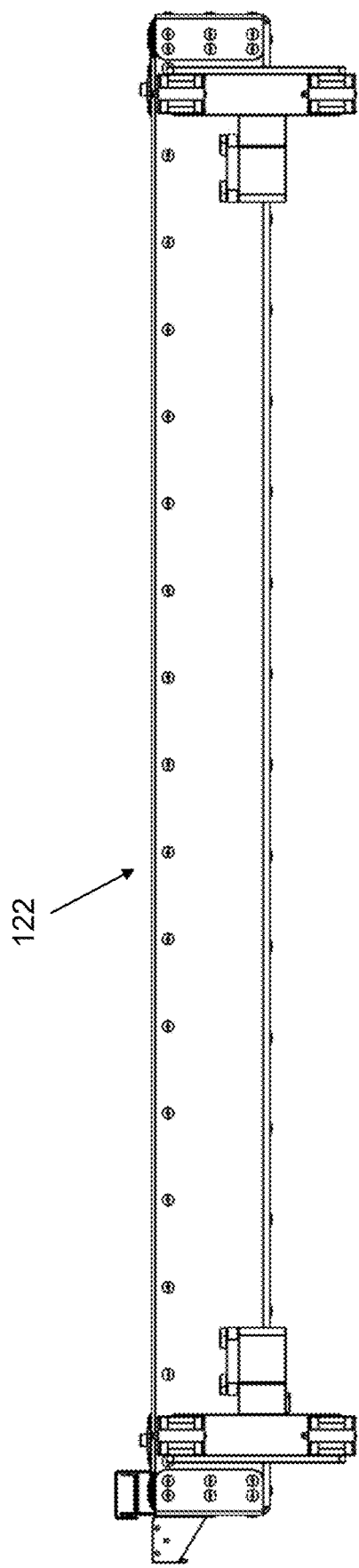
FIG. 12 is a left-side view of the main gantry assembly of FIG. 9.
Figure 13:
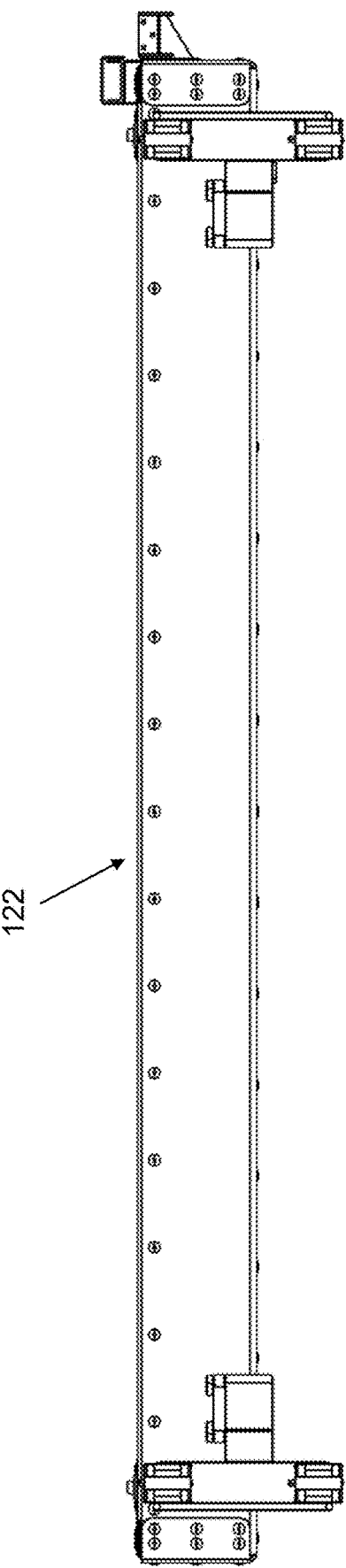
FIG. 13 is a right-side view of the main gantry assembly of FIG. 9.
Figure 14:
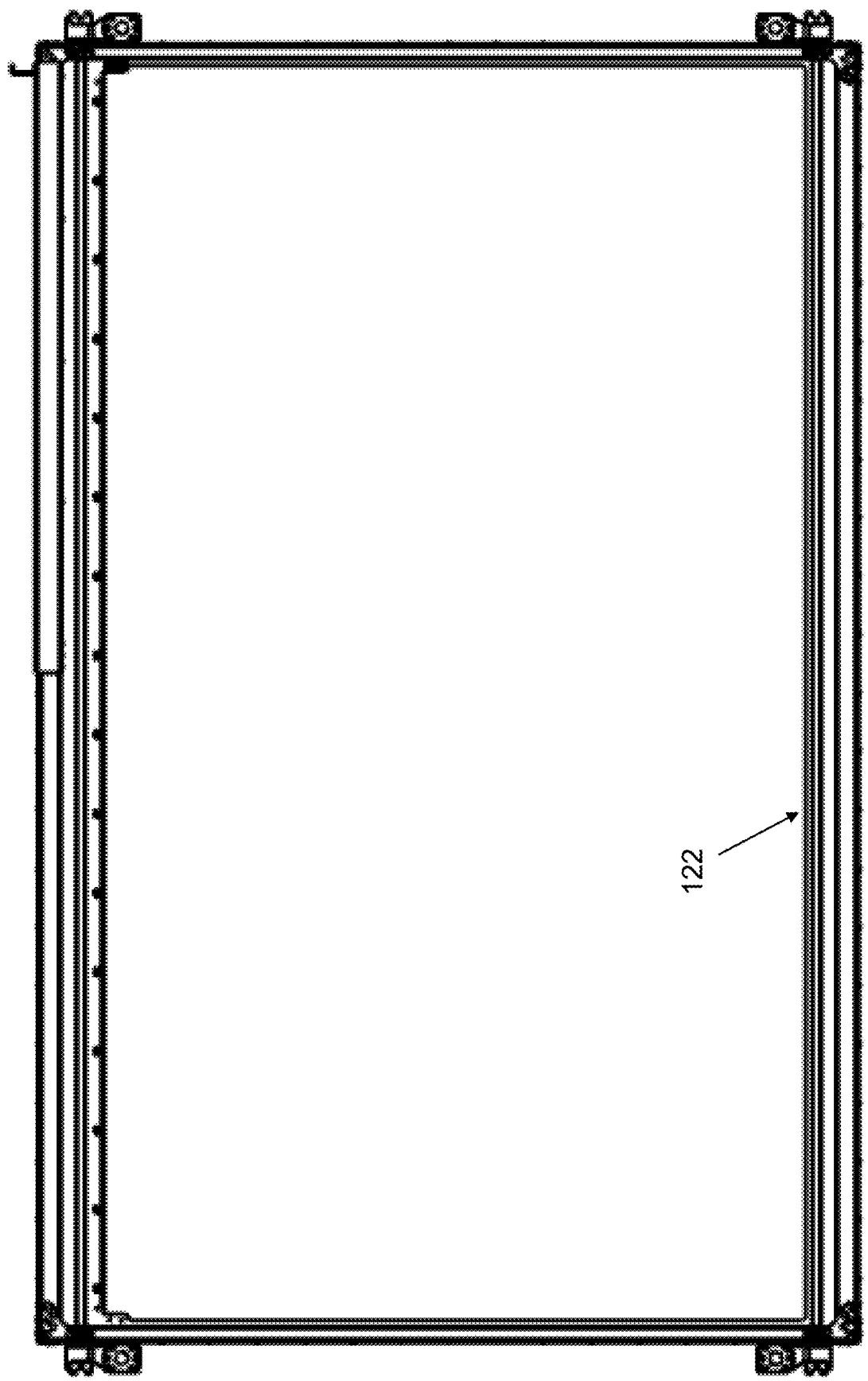
FIG. 14 is a top view of the main gantry assembly of FIG. 9.
Figure 15:
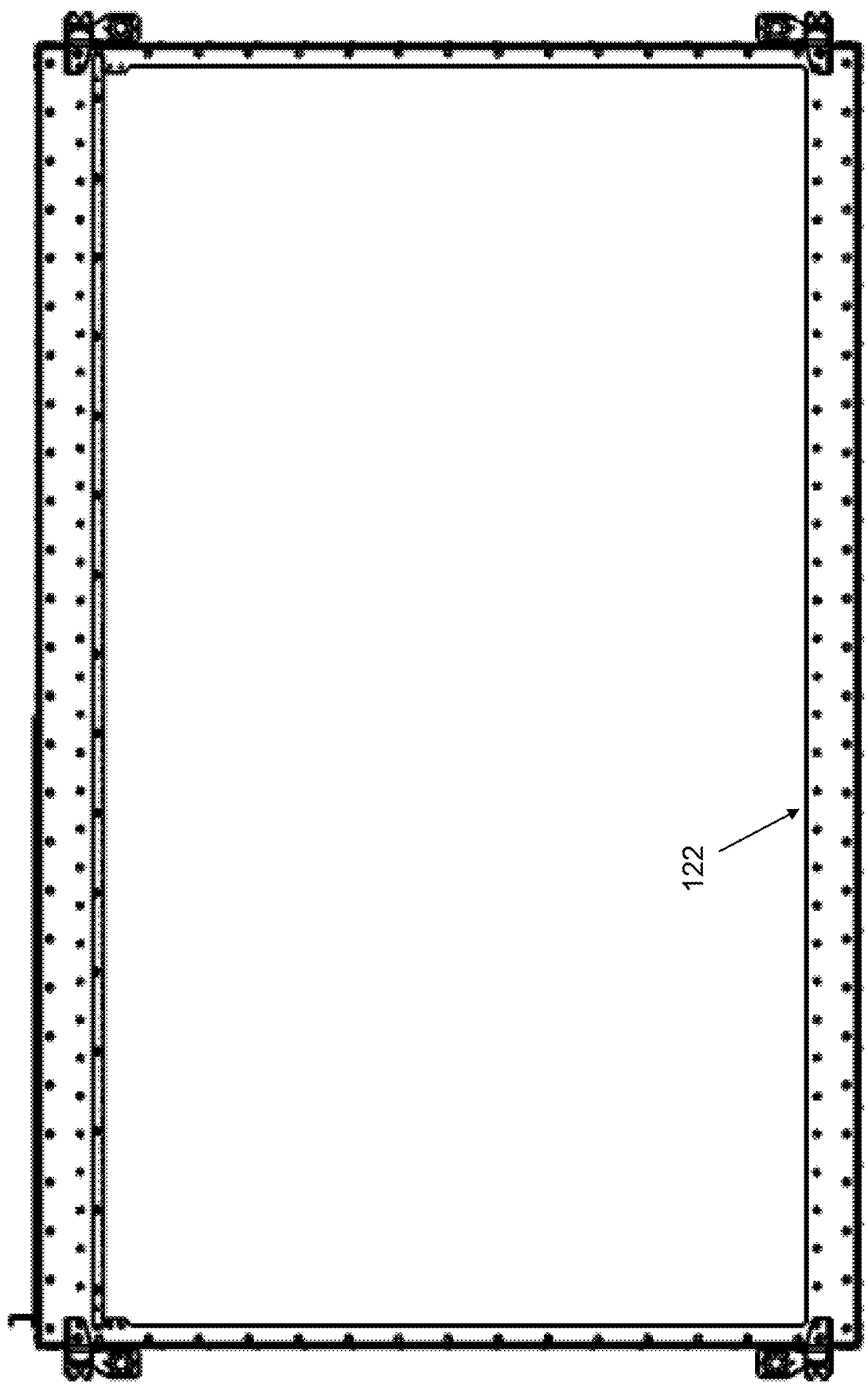
FIG. 15 is a bottom view of the main gantry assembly of FIG. 9.

FIGS. 1-21 illustrate one embodiment of an assembly 100 for a three-dimensional printer and its components. As shown in FIG. 1, the assembly 100 preferably comprises a base or bottom wall 102 which defines the x-axis and y-axis of the printer. An enlarged view of the bottom wall 102 is illustrated in FIG. 8 and described in further detail below.

Figure 6:
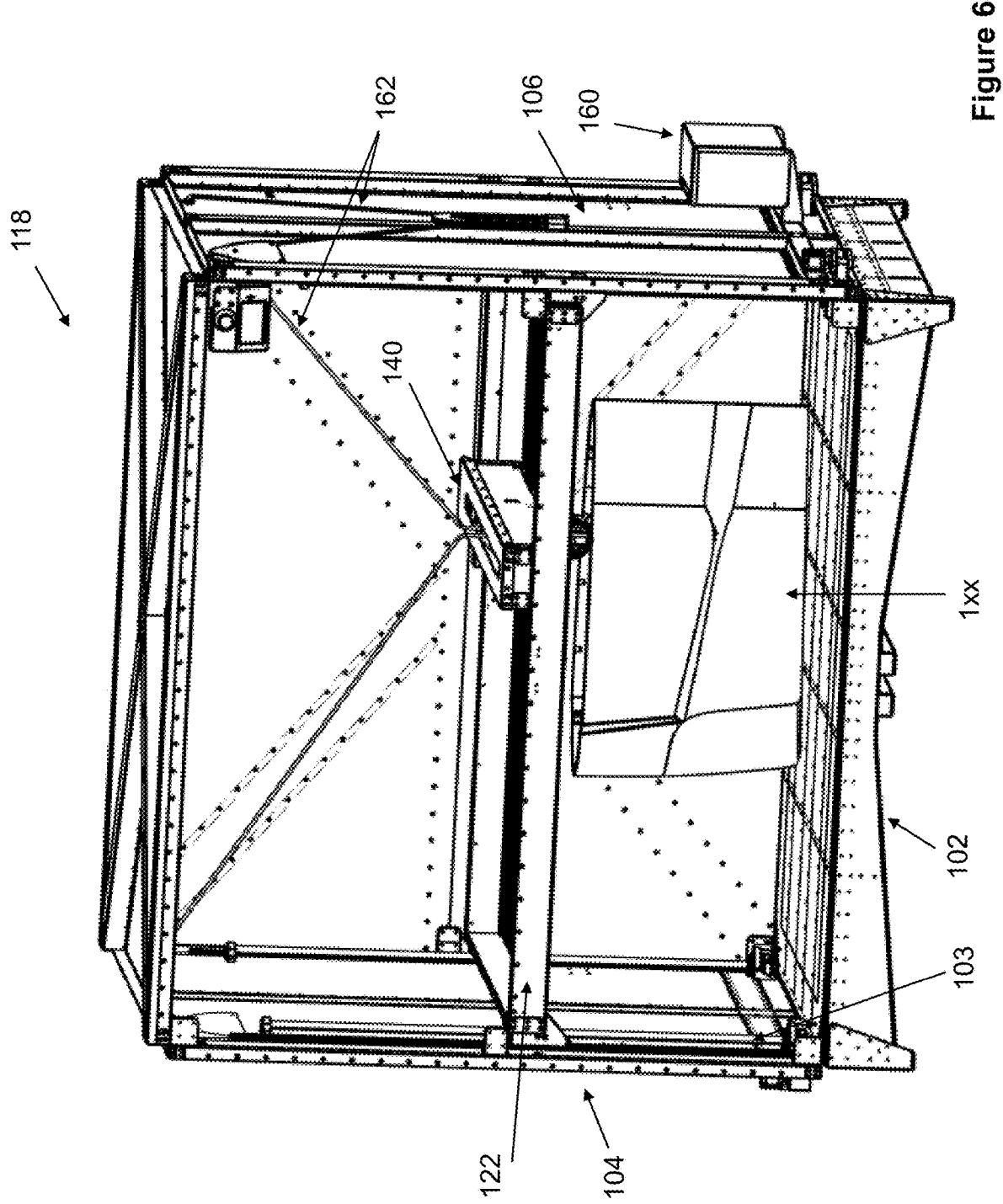
FIG. 6 is a perspective view of the assembly of FIG. 1 without the front sidewall.

A first or left vertical sidewall 104 and a second or right vertical sidewall 106 are each attached to the bottom wall 102 at opposing sides of the bottom wall 102, as shown in FIG. 6 for example. An enlarged view of the left sidewall 104 is illustrated in FIG. 7 and described in further detail below. The vertical sidewalls 104, 106 (and the back wall 108 and the front wall 103) collectively define the z-axis of the printer.

The left sidewall 104 preferably comprises a single, flat piece of material that is laser or water cut to create a set of laser or water cut apertures to which components of the printer apparatus can be attached using at least some of the apertures. The right sidewall 106 preferably comprises a single, flat piece of material that is laser or water cut to create a set of laser or water cut apertures to which components of the printer apparatus can also be attached using at least some of the apertures. Contemplated components include, for example, a linear rail or a height adjustment mechanism.

The assembly 100 further comprises a main gantry assembly 122, which is movably coupled to the first and second vertical side walls 104, 106, as further described below. The main gantry assembly 122 acts as the y-axis for the printer.

One or more spools 160 of filament 162 are shown which can be fed to store the filament 162. As can be seen in the Figures, the filament 162 travels from the spool 160 to the extruder on the carriage assembly 140.

The assembly 100 further comprises a carriage assembly 140 (shown in FIGS. 18-21), which is configured to support the print head while also allowing movement of the print head along an x-axis, as further described below.

Due to the manufacture and configuration of the assembly 100, the sets of important components critical to ensuring the accuracy of the print are bolted to a single sheet of material on the same plane. This means that all of the important items are accurate to the laser-cut flat surfaces of the assembly and are installed at precise locations on the sidewalls and within the assembly. None of these components are located on a bent section, which is critical to ensure the accuracy of the assembly 100 and the accuracy of the printing of the assembly 100.

FIG. 7 illustrates a front view of one embodiment of the left sidewall 104. It is contemplated that the right sidewall 106 can be identical to the left sidewall 104 due to its symmetry about the z-axis. The left side wall 104 preferably comprises a single, flat piece of sheet metal, which is laser or water cut to create a set of apertures to which components of the printer can be attached. Using the laser or water cut apertures, which are placed at precise locations on the side wall 104, maintains a high accuracy in the mounting points for the components shown in FIG. 6, for example. This ensures the accuracy of the component mounting which ensures the accuracy of the printer.

By installing components on flat sheets at precise locations, the accuracy of each component is increased which increases the overall accuracy of the assembly. Otherwise, inaccuracies where each component is mounted can exponentially increase the overall inaccuracy of the printer, as the inaccuracies are multiplied.

These components include, for example, the bottom brackets 109, the linear rails 110, and the threaded rods or other mechanisms 112 that is used to vary a height of the main gantry assembly 108 with respect to the bottom wall 102. The tracks 110 and the threaded rods or other mechanisms 112 are arranged along a vertical axis of the side wall 103. Thus, all of the important components from the ball screw locations to the linear rails are held perfectly aligned at installed at precise locations by the laser cut sheet metal piece in each plane.

The left side wall 104 also comprises side brackets 114 and top brackets 116 which can be used to attach additional side walls (i.e., back wall 120) and/or the top wall or surface 118 of the assembly 100.

FIG. 8 illustrates a top view of one embodiment of the bottom piece 102 of the assembly 100 shown in FIG. 6. As discussed above, the bottom piece 102 preferably comprises a single, flat top piece 102a of sheet metal that is laser cut to create a set of laser or water cut apertures at precise locations and define precise locations where the brackets 105 are attached or mounted using at least some of the apertures. The brackets 105 ensure proper positioning of the side walls 104, 106 and thereby ensure proper positioning of the z-axis relative to the bottom piece 102.

As shown, the bottom piece 102 may comprise additional components such as lower side pieces and feet, which collectively support the bottom piece 102 and assembly 100.

In addition to supporting the upper portion of the assembly 100, the top sheet 102a of the bottom piece 102 also functions as the print bed to which the extruded material can be deposited.

Figure 16:
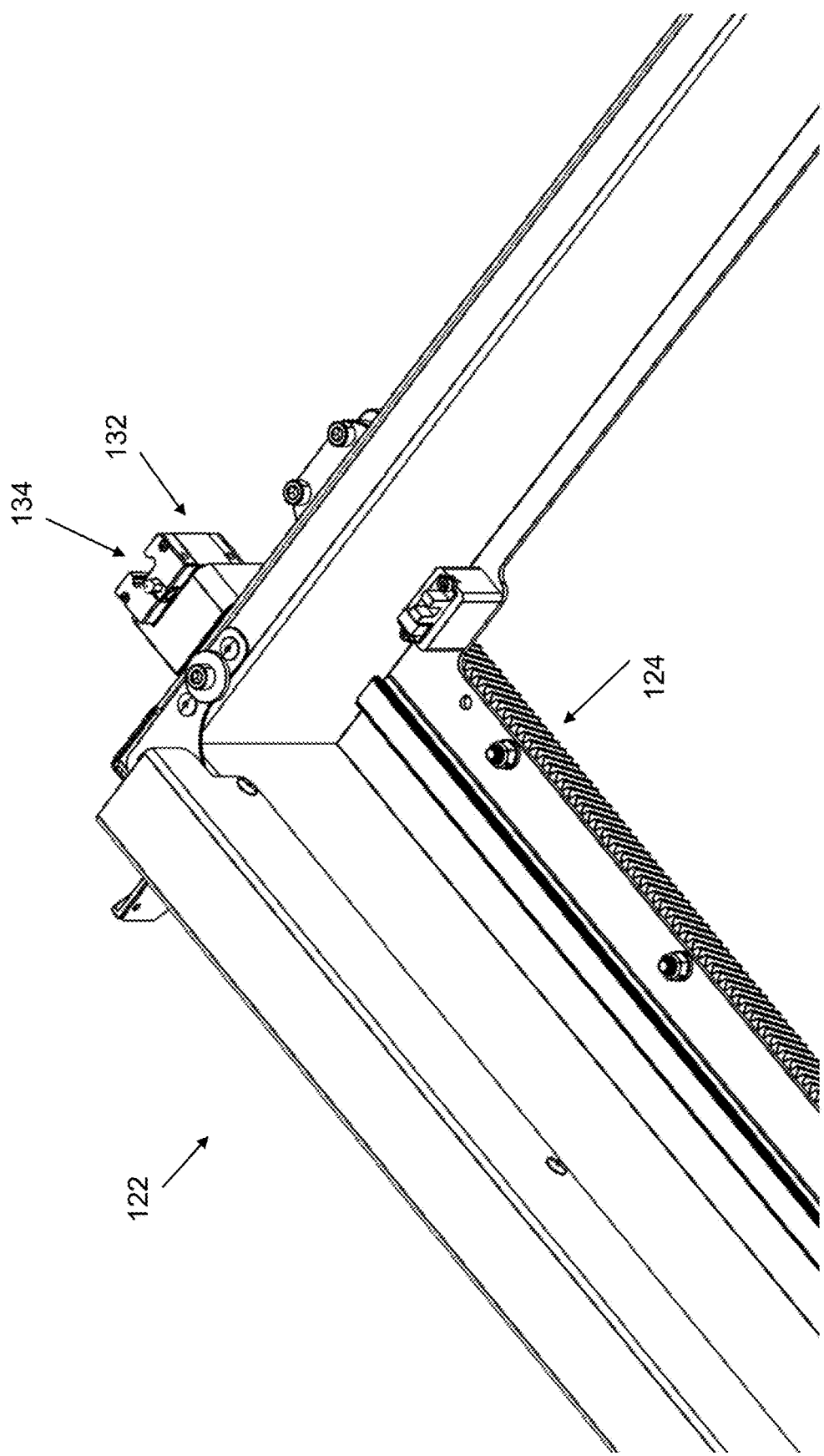
FIG. 16 is an enlarged view of the top, right corner of the main gantry assembly of FIG. 9.
Figure 17:
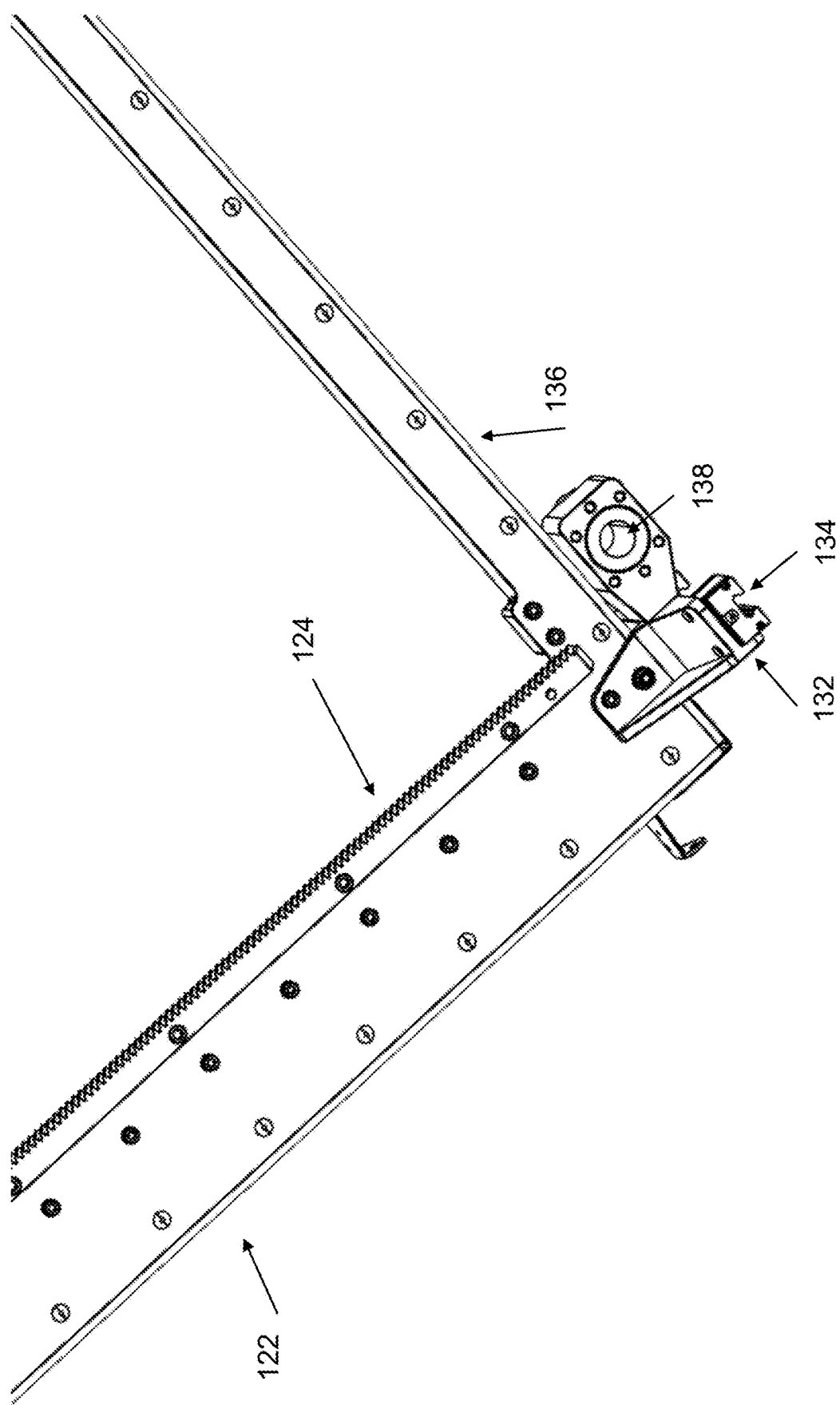
FIG. 17 is an enlarged view of the bottom, right corner of the main gantry assembly of FIG. 9.
Figure 18:
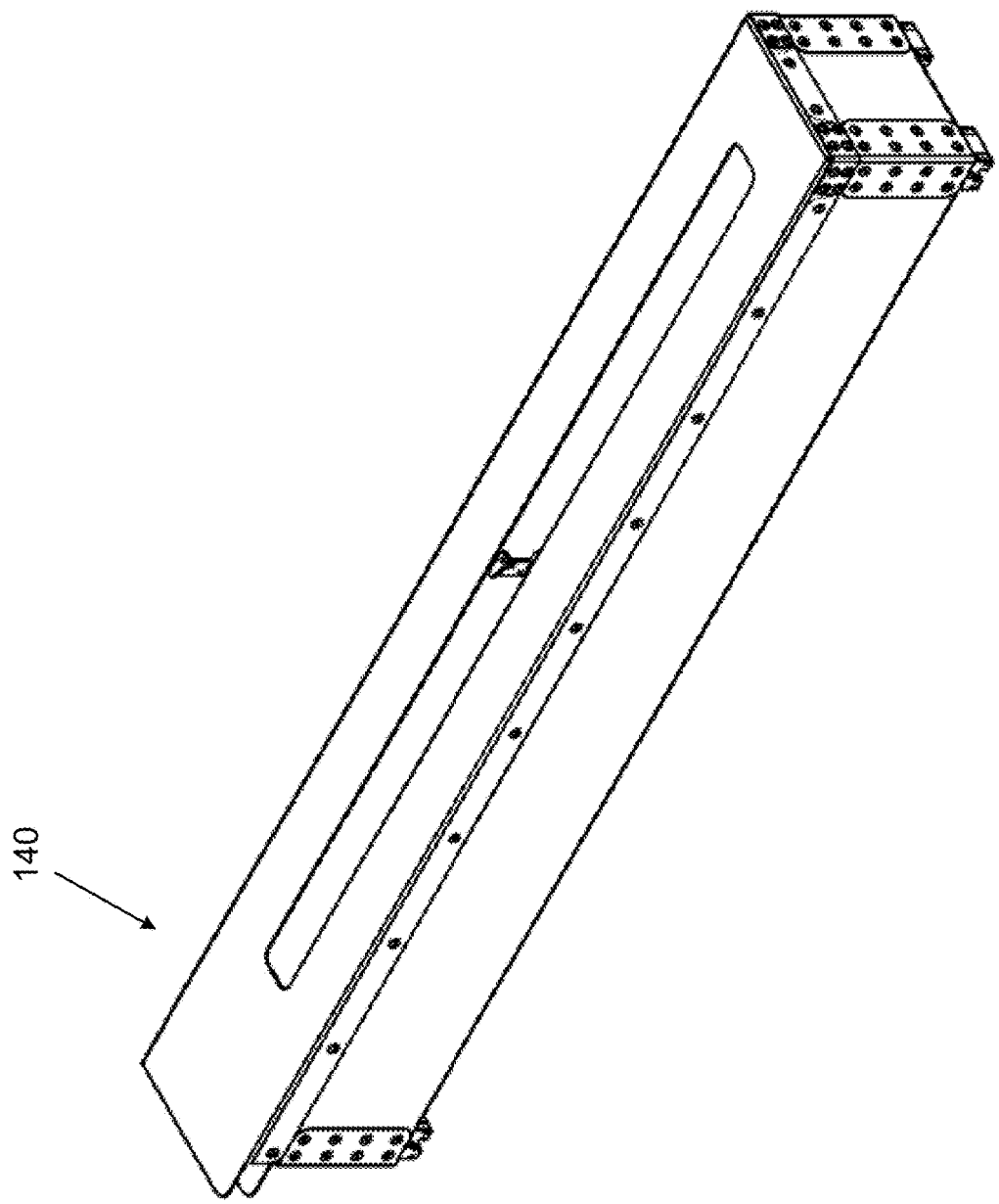
FIG. 18 is a top, perspective view of a carriage assembly of the printer assembly of FIG. 1.
Figure 19:
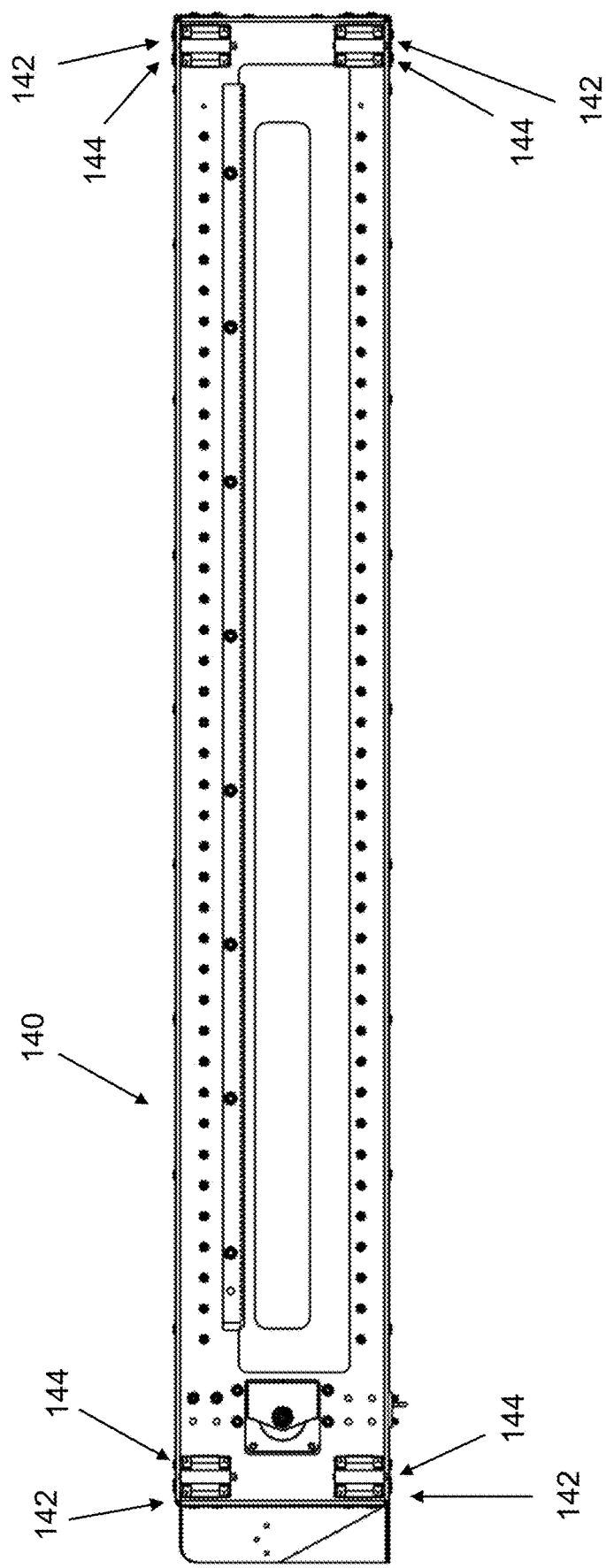
FIG. 19 is a bottom view of the carriage assembly of FIG. 18.

FIGS. 9-15 illustrate various views of one embodiment of the main gantry assembly 122 shown in FIG. 6. Enlarged views of a corner of the main gantry assembly 122 is shown in FIGS. 16-17. Preferably, the main gantry assembly 122 is formed by laser cutting a single piece of material to thereby create the overall frame of the main gantry assembly 122 to which all of the important components for the main gantry assembly 122 can be attached. These components allow the gantry assembly 122 to move vertically along the z-axis of the side walls 104, 106, and permit movement of the print head about a y-axis of the bottom piece 102 or print bed.

The main gantry assembly 122 preferably moves along the linear rails 110 to move about the z-axis, and movement of the main gantry assembly 122 can be controlled using a motor that causes rotation of the threaded rods or other mechanisms 112. Rotation in a first direction causes the main gantry assembly 122 to move upwardly relative to the bottom piece 102, while rotation in an opposite, second direction causes the main gantry assembly 122 to move downwardly relative to the bottom piece 102.

The main gantry assembly 122 comprises a horizontal rail 124, along which the carriage assembly 130 can move about the y-axis. As shown in FIGS. 16-17, the main gantry assembly 122 comprises a set of guides 132, which have a slot or opening 134 configured to receive one of the linear rails 110 of the first or second side wall 104, 106. The main gantry assembly 122 further comprises a set of z-axis mounts 136 each having a threaded aperture 138 configured to receive one of the threaded rods or other mechanisms 112.

It is important to note that the horizontal rail 124, the guides 132, and the z-axis mounts 136 mount to the single flat piece of material and flat plane of the main sheet or frame that provides the structure of the main gantry assembly 122. The sides of the main gantry assembly 122 can be bent up, but the critical components do not mount to the sides, and instead are only mounted to the flat piece of the bottom of the main gantry assembly 122. See FIG. 17. This ensures the apertures are cut at precise locations from one end to the other and corner to corner with the laser or water cut accuracy described above.

FIGS. 18-21 illustrates various views, respectively, of one embodiment of a carriage assembly 140 shown in FIG. 6. As shown, the carriage assembly 140 comprises a set of guides 142, which have a slot or opening 144 configured to receive a horizontal rail 124 of the main gantry assembly 122. The carriage assembly 140 further comprises one or more horizontal rails 146, which can be used to guide a movement of the printer head.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An assembly for a three-dimensional printer, comprising:
   a base comprising a first single, flat piece of material, wherein the first single, flat piece of material comprises a set of laser or water cut apertures, where at least some of the apertures are used to attach a first set of brackets to the base in precise locations;

a left sidewall comprising a second single, flat piece of material, wherein the left sidewall is mounted to the base via some of the first set of brackets, such that the left sidewall is perpendicular to the bottom piece;

a right sidewall comprising a third single, flat piece of material, wherein the right sidewall is mounted to the bottom piece via others of the first set of brackets, such that the right sidewall is perpendicular to the base;

wherein the second and third single, flat pieces of material each comprises a flat piece of sheet metal comprising a second set of laser or water cut apertures, where at least some of the apertures are used to attach a linear rail and a height adjustment mechanism in precise locations;

a main gantry assembly movably mounted to the left sidewall and the right sidewall via the linear rail and the height adjustment mechanism; and a carriage assembly movable mounted to the main gantry assembly via one or more horizontal rails attached to the main gantry assembly.

2. The assembly of claim 1, wherein the bottom piece defines an x-axis and a y-axis of the assembly.

3. The assembly of claim 1, wherein the left sidewall and the right sidewall collectively define a z-axis of the assembly.

4. The assembly of claim 1, wherein the main gantry assembly further comprises a bottom portion comprising a single, flat piece of material that is laser or water cut and comprises a third set of laser or water cut apertures, where at least some of the apertures are used to attach the one or more horizontal rails to the main gantry assembly at precise locations.

5. The assembly of claim 1, wherein the main gantry assembly further comprises a set of guides each configured to receive one of the linear rails.

6. The assembly of claim 1, wherein the carriage assembly further comprises a set of guides each configured to receive one of the horizontal rails.

* * * * *